United States Patent
Yang et al.

(10) Patent No.: US 12,344,755 B2
(45) Date of Patent: Jul. 1, 2025

(54) METHOD FOR MANUFACTURING CARBON QUANTUM DOTS SHOWING DISCOLORATION CHARACTERISTICS IN THE CUMULATIVE AMOUNT OF UV EXPOSURE, AND COLOR CHANGE SENSOR INCLUDING THE SAME

(71) Applicant: PUKYONG NATIONAL UNIVERSITY INDUSTRY-UNIVERSITY COOPERATION FOUNDATION, Busan (KR)

(72) Inventors: Hyun Kyoung Yang, Busan (KR); Jin Young Park, Busan (KR)

(73) Assignee: PUKYONG NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 756 days.

(21) Appl. No.: 17/649,536

(22) Filed: Jan. 31, 2022

(65) Prior Publication Data

US 2022/0267631 A1 Aug. 25, 2022

(30) Foreign Application Priority Data

Feb. 22, 2021 (KR) .................. 10-2021-0023058

(51) Int. Cl.
*C09D 11/50* (2014.01)
*C09D 11/033* (2014.01)
*C09D 11/037* (2014.01)
*C09D 11/324* (2014.01)
*C09D 11/36* (2014.01)
*G01N 21/27* (2006.01)

(52) U.S. Cl.
CPC ............ *C09D 11/50* (2013.01); *C09D 11/033* (2013.01); *C09D 11/037* (2013.01); *C09D 11/324* (2013.01); *C09D 11/36* (2013.01); *G01N 21/272* (2013.01)

(58) Field of Classification Search
CPC ..... C09D 11/50; C09D 11/033; C09D 11/037; C09D 11/324; C09D 11/36; G01N 21/272
USPC .................................................. 252/301.36
See application file for complete search history.

(56) References Cited

FOREIGN PATENT DOCUMENTS

WO    WO 2020/121119    6/2020

OTHER PUBLICATIONS

Egorova et al., "Properties of Carbon Dots Synthesized Solvothermally from Citric Acid and Urea", Journal of Structural Chemistry, 2020, vol. 61, No. 5, pp. 811-817. (Year: 2020).*

* cited by examiner

*Primary Examiner* — Anita Nassiri-Motlagh
(74) *Attorney, Agent, or Firm* — NORTON ROSE FULBRIGHT US LLP

(57) ABSTRACT

Disclosed are a method for producing carbon quantum dots having color change based on a cumulative amount of exposure thereof to UV light, and to a color change sensor including the same that indicates a cumulative UV amount. The method for producing the carbon quantum dots include performing solvothermal reaction on blue inkjet printer dye, urea and an organic solvent in a high pressure reactor.

7 Claims, 17 Drawing Sheets

METHOD FOR MANUFACTURING CARBON QUANTUM DOTS SHOWING DISCOLORATION CHARACTERISTICS IN THE CUMULATIVE AMOUNT OF UV EXPOSURE, AND COLOR CHANGE SENSOR INCLUDING THE SAME

CROSS-REFERENCE TO RELATED APPLICATION

This application claims a benefit under 35 U.S.C. § 119(a) of Korean Patent Application No. 10-2021-0023058 filed on Feb. 22, 2021, on the Korean Intellectual Property Office, the entirety of disclosure of which is incorporated herein by reference for all purposes.

BACKGROUND

Field

The present disclosure relates to a method for producing carbon quantum dots having color change based on a cumulative amount of exposure to UV, and to a color change sensor including the same that indicates a cumulative UV amount.

Description of Related Art

Ultraviolet light has a wavelength shorter than that of purple (violet) of visible light of daylight and is referred to as UV (Ultraviolet) as an abbreviation. Ultraviolet rays are classified into ultraviolet A (UV-A; 315 to 400 nm), ultraviolet B (UV-B; 280 to 315 nm), and ultraviolet C (UV-C; 100 to 280 nm) according to a wavelength.

When ultraviolet rays are irradiated to the human body, weakening of the human immune system and incidence of skin cancer increase, which may cause photoaging of the skin. Photoaging refers to a phenomenon in which when the skin is continuously exposed to ultraviolet rays, pigmentation and decrease in collagen and elastin occur such that skin elasticity is reduced and thick wrinkles are formed. Further, exposure to UV light for a long period of time may lead to rapid eye aging, which may lead to eye diseases such as cataracts.

In order to protect the eyes from UV rays, wearing sunglasses, inserting a UV blocking filter into the eyeball, etc. are known. Further, applying sunscreen is used to protect the skin.

However, it is difficult to fundamentally recognize how much the human body has been exposed to UV rays. A UV marker as currently available is bulky and is inconvenient to carry and performs only real-time light quantity measurement. However, the UV marker as currently available cannot measure a cumulative light quantity based on an irradiation time of ultraviolet rays.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

One purpose of the present disclosure is to provide a method for producing carbon quantum dots having color change based on a cumulative amount of exposure to UV.

Another object of the present disclosure is to provide a color change sensor including the carbon quantum dots that indicates a cumulative UV amount.

Purposes in accordance with the present disclosure are not limited to the above-mentioned purpose. Other purposes and advantages in accordance with the present disclosure as not mentioned above may be understood from following descriptions and more clearly understood from embodiments in accordance with the present disclosure. Further, it will be readily appreciated that the purposes and advantages in accordance with the present disclosure may be realized by features and combinations thereof as disclosed in the claims.

One aspect of the present disclosure provides a method for producing carbon quantum dots having color change based on a cumulative amount of exposure thereof to UV light, the method including performing solvothermal reaction on blue inkjet printer dye, urea and an organic solvent in a high pressure reactor.

In one implementation of the method, the organic solvent includes one selected from a group consisting of DMF (dimethylformamide), ethanol, cyclohexane, toluene, THF (tetrahydrofuran) and benzene.

In one implementation of the method, the solvothermal reaction is performed for 3 hours or larger and at a temperature in a range of 180° C. to 250° C.

In one implementation of the method, the carbon quantum dots obtained via the solvothermal reaction have change in color or fluorescence based on a cumulative amount of exposure thereof to UV light.

One aspect of the present disclosure provides a color change sensor for indicating a cumulative UV amount, the sensor including carbon quantum dots obtained by performing solvothermal reaction on blue inkjet printer dye, urea and an organic solvent in a high-pressure reactor.

In one implementation of the sensor, the organic solvent includes one selected from a group consisting of DMF (dimethylformamide), ethanol, cyclohexane, toluene, THF (tetrahydrofuran) and benzene.

In one implementation of the sensor, the color change sensor includes a liquid type sensor.

In one implementation of the sensor, the carbon quantum dots have change in color or fluorescence based on a cumulative amount of exposure thereof to UV light.

According to the present disclosure, carbon quantum dots having a color change based on a cumulative amount of exposure to UV may be produced via solvothermal reaction using a blue inkjet printer dye.

The color change sensor including the carbon quantum dots exhibits color change based on an irradiation time of UV. Thus, a cumulative amount of UV irradiated to the human body over time may be identified. The sensor may be produced in a liquid form and may have high portability.

In addition to the effects as described above, specific effects in accordance with the present disclosure will be described together with following detailed descriptions for carrying out the disclosure.

DETAILED DESCRIPTION

Figure 1:
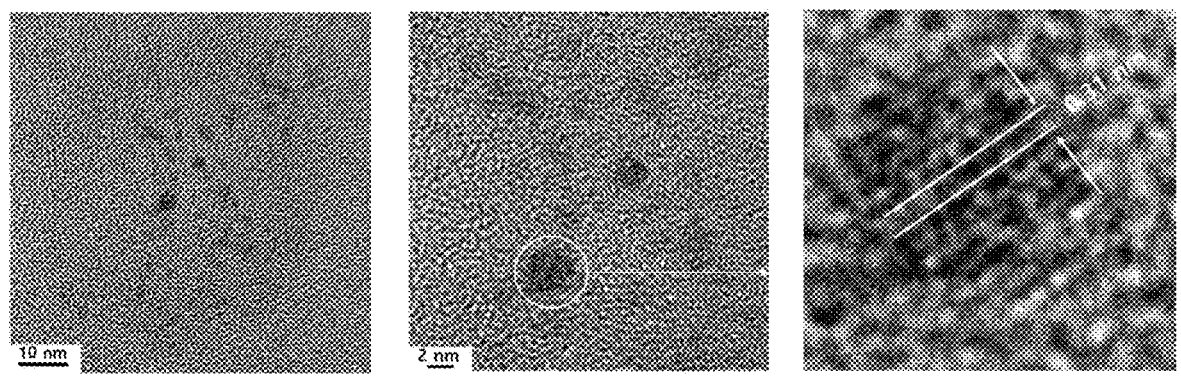
FIG. 1 shows a transmission electron microscope image of carbon quantum dots synthesized according to an embodiment of the present disclosure.

The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, and components have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A method for producing carbon quantum dots having color change based on a cumulative amount of exposure to UV according to an embodiment of the present disclosure includes performing solvothermal reaction on a blue inkjet printer dye, urea and an organic solvent in a high-pressure reactor.

In an embodiment, the blue inkjet printer dye may include commercially available products, for example, blue inkjet printer dyes produced by Samsung, Brother, etc.

In one embodiment, the organic solvent may include any one or more selected from dimethylformamide (DMF), ethanol, cyclohexane, toluene, tetrahydrofuran (THF), and benzene. Under the presence of the organic solvent, the solvothermal-synthesized carbon quantum dots have color change based on a cumulative amount of exposure to UV.

In one embodiment, the solvothermal reaction may be performed at a temperature in a range of 180° C. to 250° C. and for 3 hours or greater. When solvothermal reaction is performed at a temperature lower than 180° C., there is no chemical reaction with urea, so that carbon quantum dots in a red solution are synthesized, and thus the color of the synthesized carbon quantum dots does not change before and after exposure to UV. When the solvothermal reaction is performed in excess of 250° C., there is a problem that the color of the synthesized carbon quantum dots does not change before and after exposure to UV.

Further, it is preferable to perform the solvothermal reaction for at least 3 hours to achieve a sufficient reaction. When the solvothermal reaction is performed for a time duration smaller than 3 hours, the synthesis of carbon quantum dots may not be achieved.

Thus, the method according to the present disclosure may produce carbon quantum dots having color change based on the cumulative amount of exposure to UV via the solvothermal reaction using the blue inkjet printer dye.

Because the carbon quantum dots obtained via the solvothermal reaction exhibit change in color or fluorescence depending on the cumulative amount of exposure to UV, the cumulative amount of UV irradiated to the human body over time may be identified using the carbon quantum dots. Thus, the carbon quantum dots may be used as a sensor material to detect the UV cumulative amount.

Further, another aspect of the present disclosure provides a color change sensor including carbon quantum dots obtained via solvothermal reaction on a blue inkjet printer dye, urea and an organic solvent in a high-pressure reactor, wherein the sensor indicates a cumulative UV amount.

In one embodiment, the color change sensor may be a liquid type sensor, and thus have high portability. For example, the color change sensor may be a liquid type sensor in which carbon quantum dots are dissolved in purified water or DMF. However, the disclosure is not limited thereto.

In one embodiment, because the carbon quantum dots have change in color or fluorescence based on the cumulative amount of exposure to UV, the cumulative amount of UV irradiated to the human body over time may be identified using the dots.

Hereinafter, various examples and experimental examples of the present disclosure will be described in detail. However, the following examples are only some examples of the present disclosure, and the present disclosure should not be construed as being limited to the following examples.

Present Example 1

35 mL of DMF (Dimethylformamide), 4 mL of blue inkjet printer dye (High Density INK, Geotech Ink Co., Ltd.), and 1 g of urea were introduced into a beaker and were mixed with each other via stirring. The mixed solution was transferred to into an autoclave, and the mixed solution reacted at a temperature of 200° C. for 3 hours.

After completion of the reaction, the autoclave was cooled slowly, and the solution was filtered using a membrane filter to obtain synthesized carbon quantum dots (Present Example 1).

FIG. 1 shows a transmission electron microscope image of carbon quantum dots synthesized according to an embodiment of the present disclosure.

As shown in FIG. 1, each of carbon quantum dots (Present Example 1) has a spherical shape and a particle size of 5 nm or smaller. Further, carbon quantum dots showed a lattice spacing of 0.31 nm corresponding to a (002) peak of graphite carbon.

Then, for color change evaluation of carbon quantum dots, 4 ml of carbon quantum dots synthesized according to Present Example 1 were put in a glass bottle.

Color Change of Carbon Quantum Dots

Then, in order to identify changes in color (under day light) and fluorescence (under 365 nm) based on an exposure time duration of the carbon quantum dots to UV, the carbon quantum dots solution was exposed to UV light of each of wavelengths of 254 nm and 365 nm for 600 minutes. Then, the color change and fluorescence change of carbon quantum dots based on an exposure time duration to UV were measured under each of daylight and UV of 365 nm wavelength.

Figure 2:
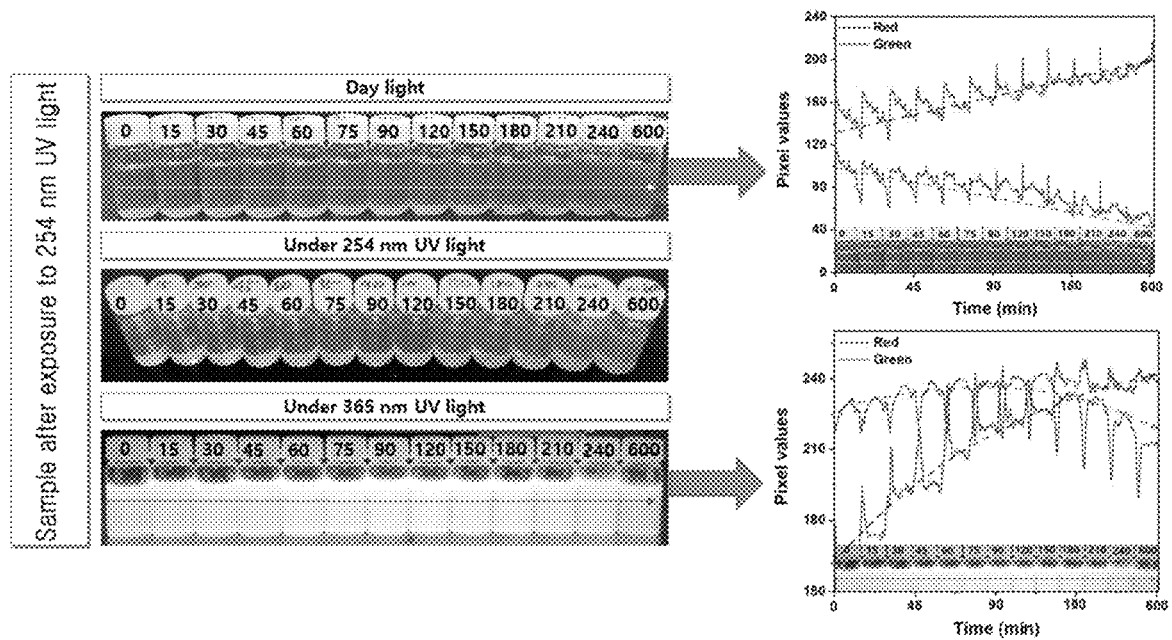
FIG. 2 shows a captured image (left) of color change and fluorescence change based on an exposure time duration to UV of 254 nm wavelength of carbon quantum dots according to Present Example 1 of the present disclosure, and a graph (right) representing the color change and fluorescence change as pixel values.

FIG. 2 shows a captured image (left) of color change and fluorescence change based on an exposure time duration to UV of 254 nm wavelength of carbon quantum dots according to Present Example 1 of the present disclosure, and a graph (right) representing the color change and fluorescence change as pixel values.

Referring to FIG. 2, it may be identified that under daylight, the carbon quantum dots according to the present disclosure have a color change in which red gradually increases and green gradually decreases over an exposure time duration to UV.

Further, based on the change in fluorescence under a wavelength of 365 nm, it may be observed that the red color is gradually increased, and the green color is gradually decreased over an exposure time duration to UV.

Figure 3:
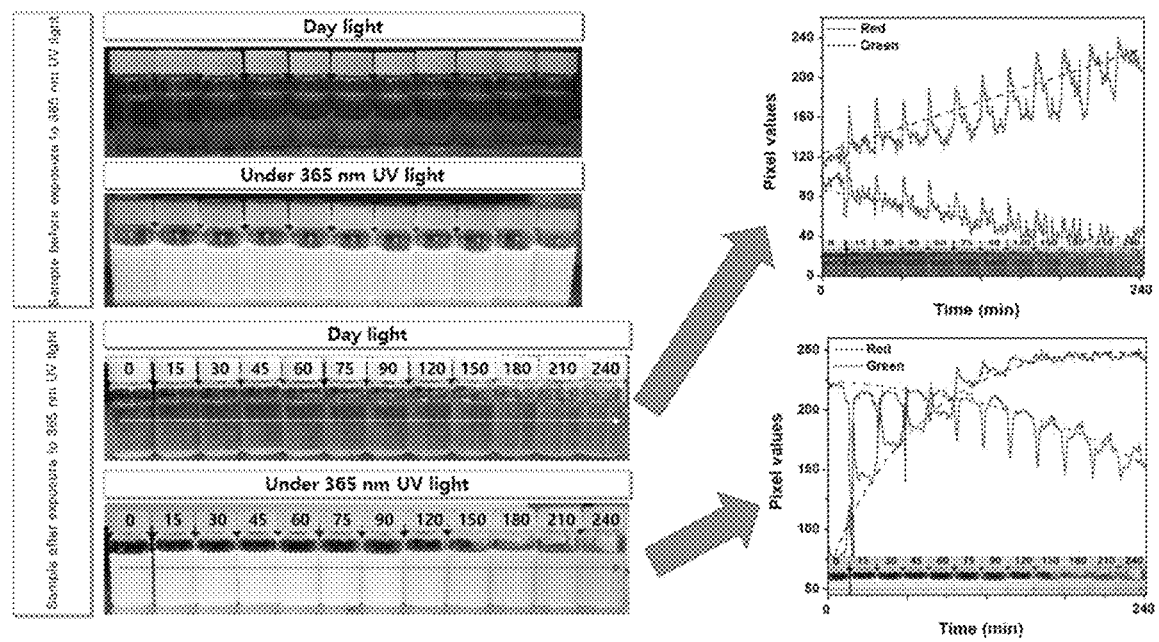
FIG. 3 shows a captured image (left) of color change and fluorescence change based on an exposure time duration to UV of 365 nm wavelength of carbon quantum dots according to Present Example 1 of the present disclosure, and a graph (right) representing the color change and fluorescence change as pixel values.

FIG. 3 shows a captured image (left) of color change and fluorescence change based on an exposure time duration to UV of 365 nm wavelength of carbon quantum dots according to Present Example 1 of the present disclosure, and a graph (right) representing the color change and fluorescence change as pixel values.

Referring to FIG. 3, it may be identified that under daylight, the carbon quantum dots according to the present disclosure have a color change in which red gradually increases and green gradually decreases over an exposure time duration to UV. Further, based on the change in fluorescence under a wavelength of 365 nm, it may be observed that the red color is gradually increased, and the green color is gradually decreased over an exposure time duration to UV.

Comparison Between Characteristics of Carbon Quantum Dots Based on Presence or Absence of Urea To compare characteristics of carbon quantum dots based on presence or absence of urea during the solvothermal reaction with each other, carbon quantum dots were synthesized in the same manner as in Present Example 1 except that urea was not added (hereinafter referred to as Comparative Example 1).

Figure 4:
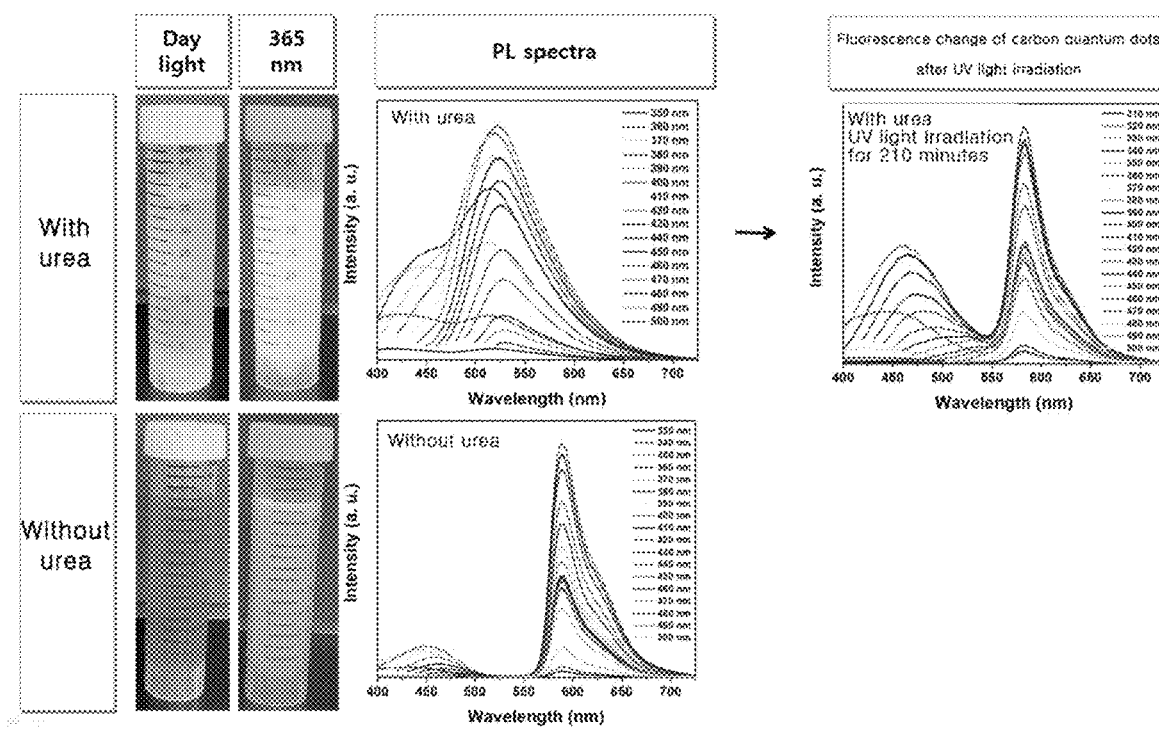
FIG. 4 shows an image and a PL spectrum as measurements of color change and fluorescence change of carbon quantum dots synthesized according to each of Present Example 1 and Comparative Example 1 of the present disclosure before and after UV light irradiation under daylight and 365 nm wavelength UV.

FIG. 4 shows an image and a PL spectrum as measurements of color change and fluorescence change of carbon quantum dots synthesized according to each of Present Example 1 and Comparative Example 1 of the present disclosure before and after UV light irradiation under daylight and 365 nm wavelength UV.

As shown in FIG. 4, it may be identified that the colors and fluorescence colors of the carbon quantum dots according to Present Example 1 and Comparative Example 1 are different from each other. Further, when the carbon quantum dots synthesized without urea were irradiated with UV light, the color thereof does not change.

Comparison Between Characteristics of Carbon Quantum Dots Based on Solvent Types As shown in Table 1 below, carbon quantum dots were synthesized in the same manner as in Present Example 1 using various solvents.

TABLE 1

|  | Solvent type |
| --- | --- |
| Present Example 1 | DMF |
| Present Example 1-1 | EtOH |
| Present Example 1-2 | Cyclohexane |
| Present Example 1-3 | Toluene |
| Present Example 1-4 | THF |
| Present Example 1-5 | Benzene |
| Comparative Example 1-1 | DI water |
| Comparative Example 1-2 | 2-PrOH |
| Comparative Example 1-3 | Acetone |

Figure 5:
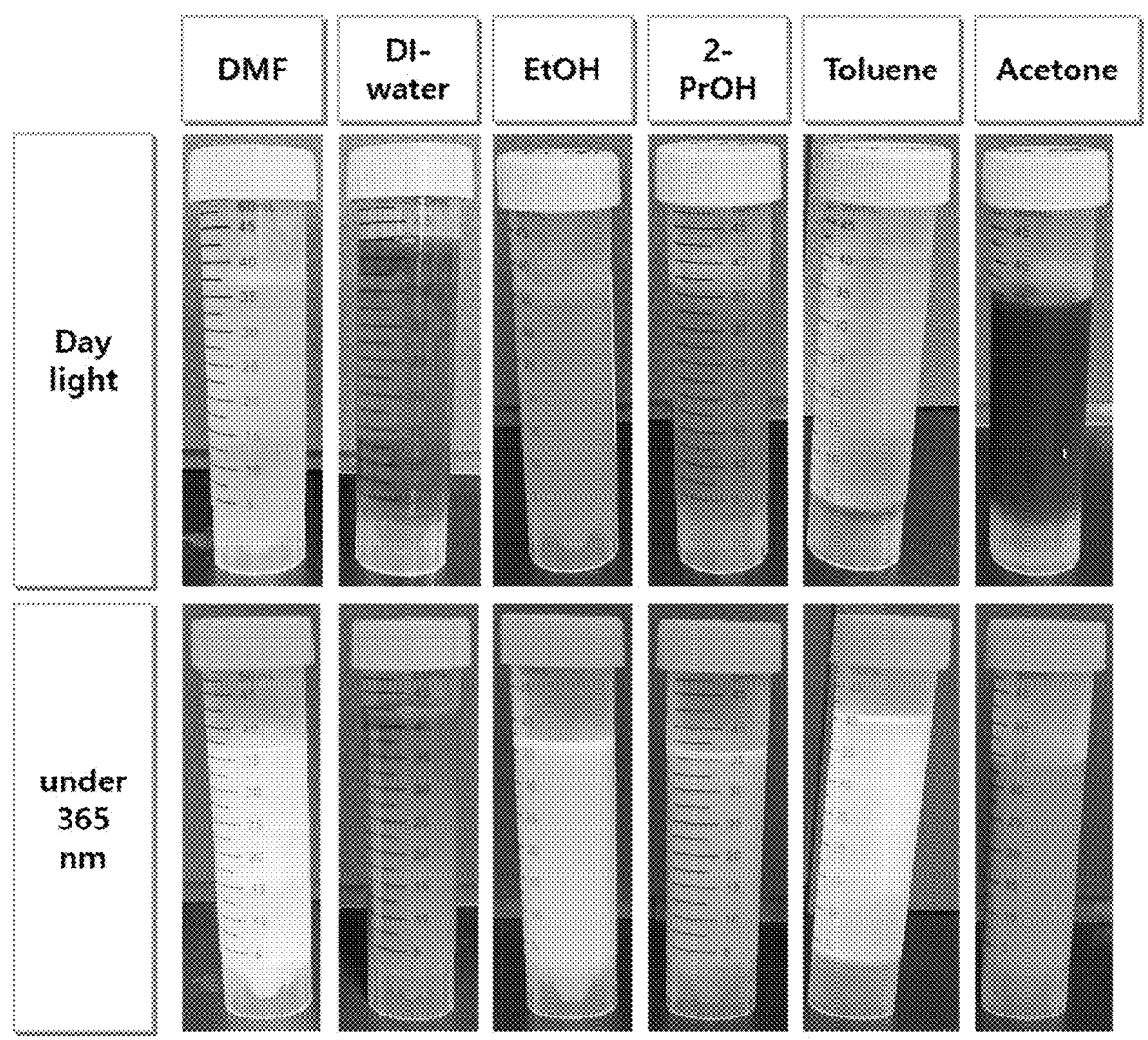
FIG. 5 is an image showing color and fluorescence of carbon quantum dots synthesized using various solvents.

FIG. 5 is an image showing color and fluorescence of carbon quantum dots synthesized using various solvents. FIG. 6A to FIG. 6H show captured images of color changes and fluorescence changes based on an exposure time duration to UV of carbon quantum dots synthesized according to Present Examples 1-1 to 1-5, and Comparative Examples 1-1 to 1-3 of the present disclosure, respectively.

In the Present Example 1, as shown in FIG. 2, it may be seen that the red color gradually increases and the green color gradually decreases over an exposure time duration to UV.

Figure 6A:
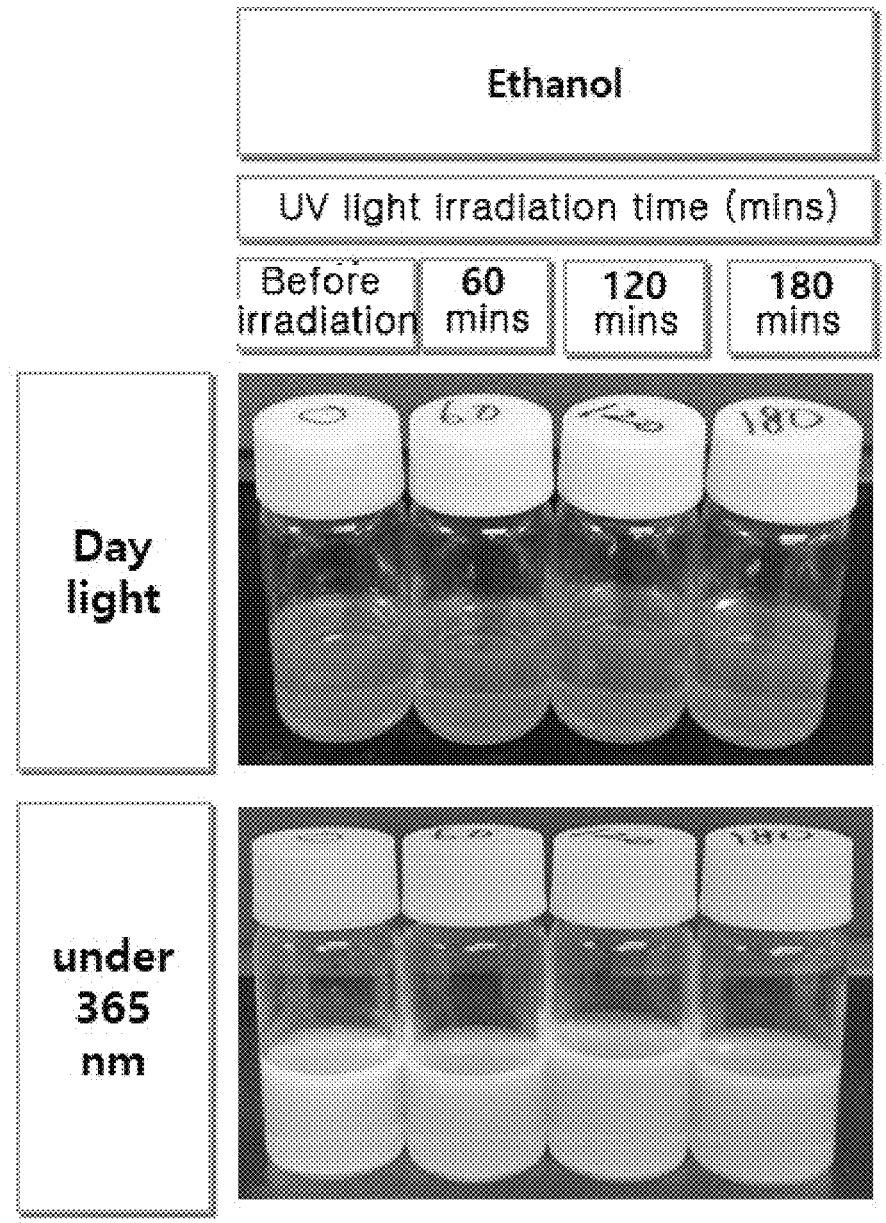
FIG. 6A to FIG. 6H show captured images of color changes and fluorescence changes based on an exposure time duration to UV of carbon quantum dots synthesized according to Present Examples 1-1 to 1-5, and Comparative Examples 1-1 to 1-3 of the present disclosure, respectively.

In the Present Example 1-1, as shown in FIG. 6A, when the synthesized carbon quantum dots were exposed to UV light, the color of the solution became slightly darker, and change in emission color was observed under the UV excitation light before and after UV light irradiation.

Figure 6B:
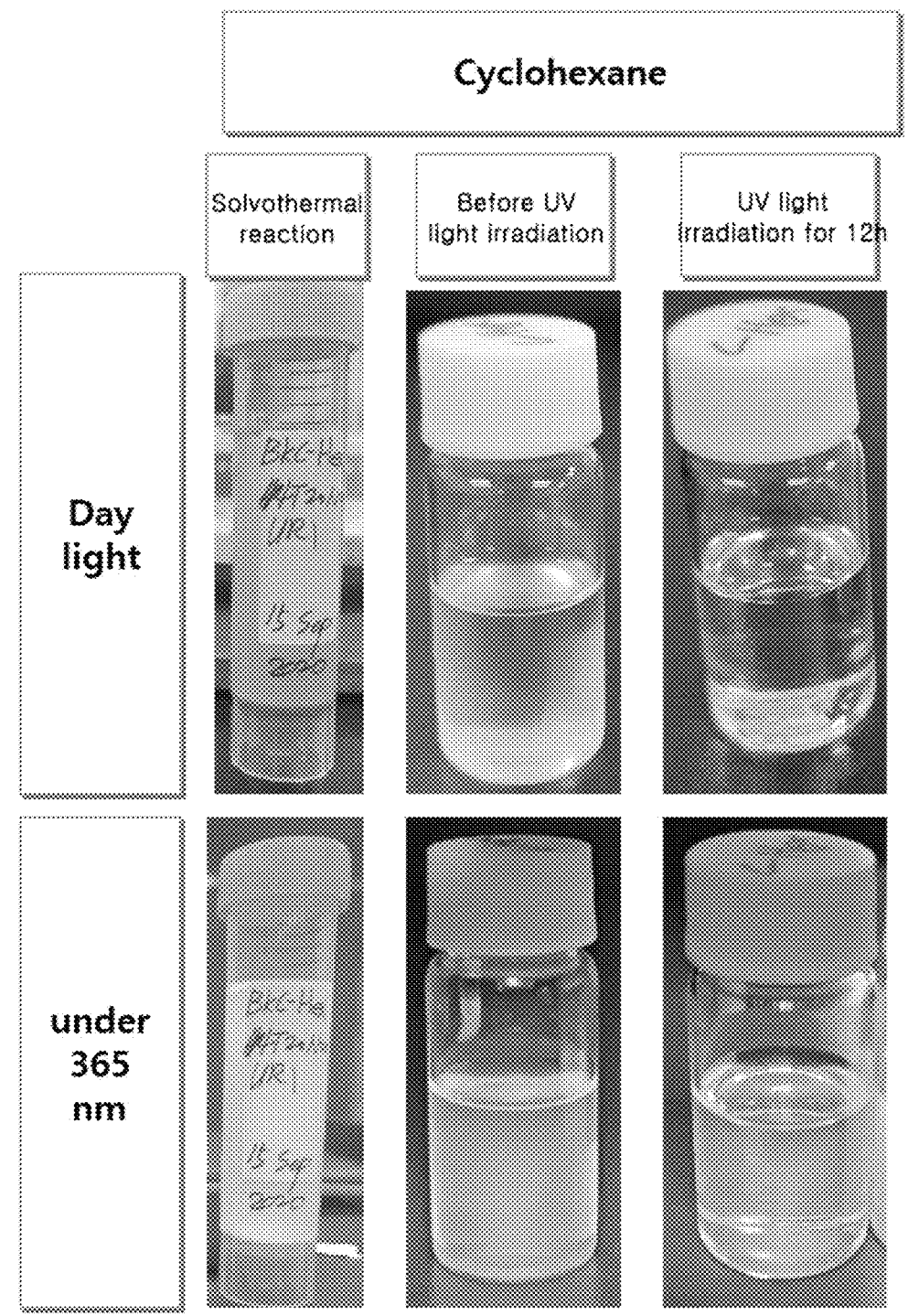

In the Present Example 1-2, as shown in FIG. 6B, when the synthesized carbon quantum dots were exposed to UV light, the color of the solution did not change, and emission color therefrom was changed from blue to green under the UV excitation light.

Figure 6C:
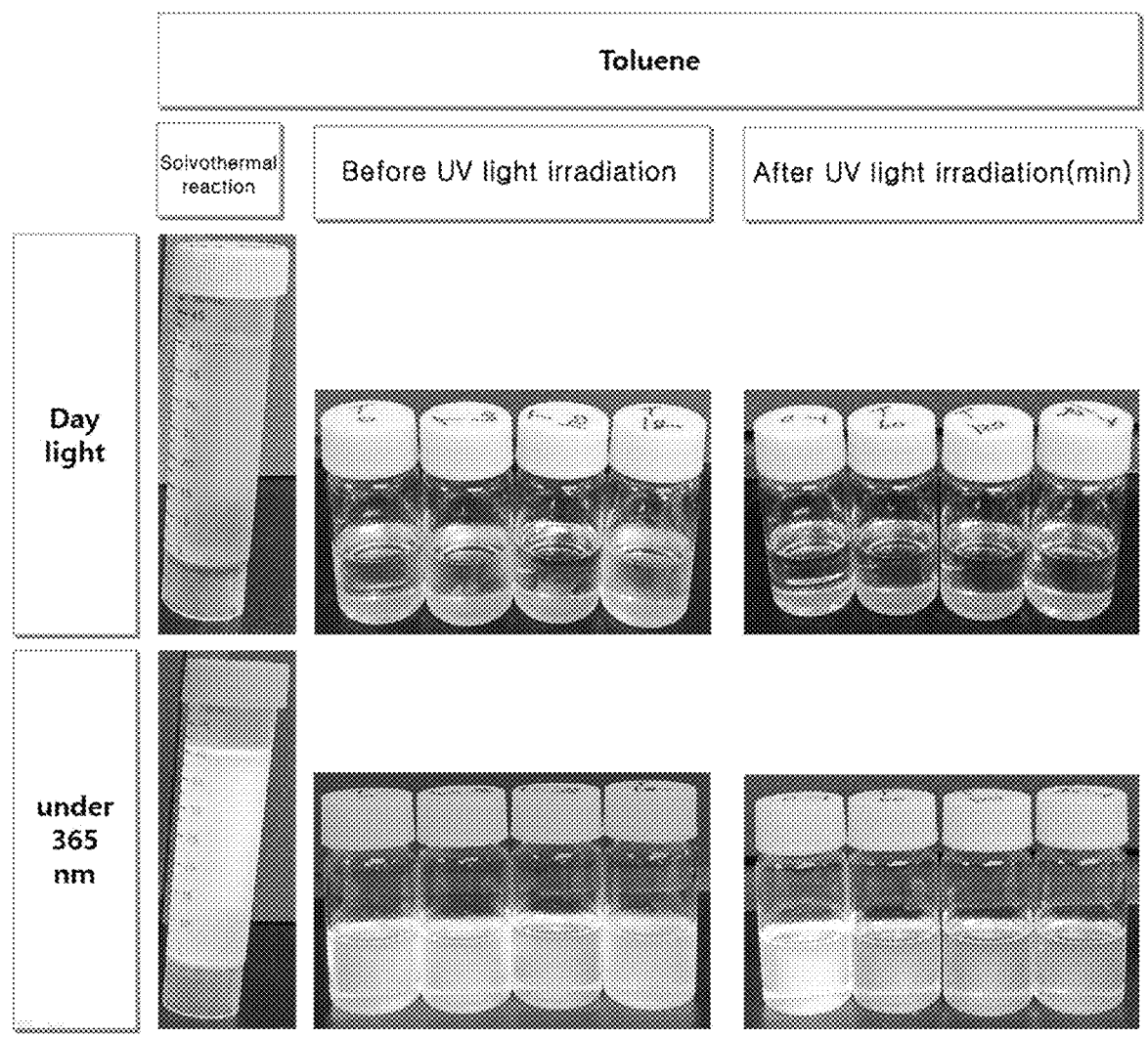

In the Present Example 1-3, as shown in FIG. 6C, when the synthesized carbon quantum dots were exposed to UV light, the color of the solution was changed to red, and emission color therefrom was changed from blue to green under the UV excitation light.

Figure 6D:
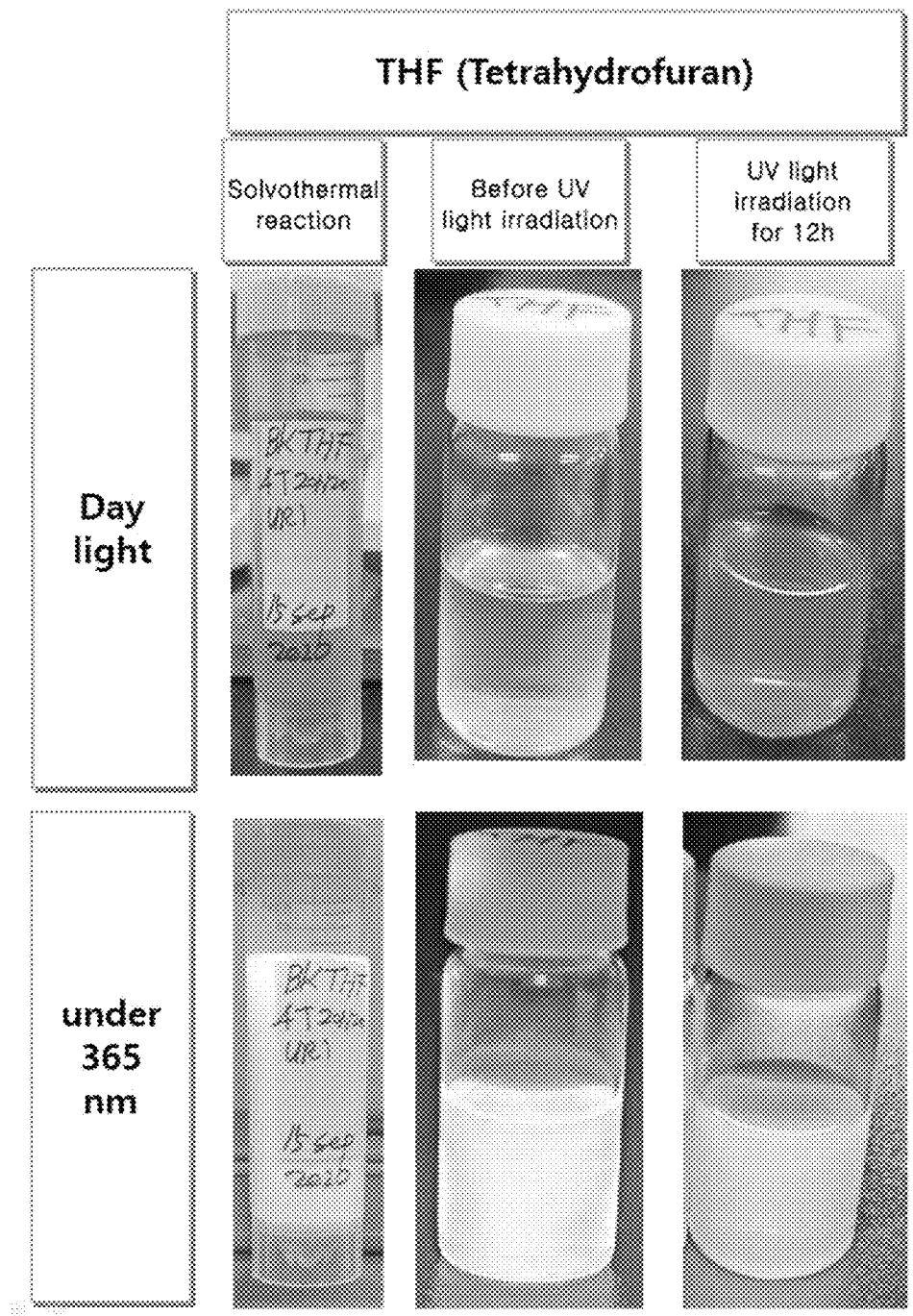

In the Present Example 1-4, as shown in FIG. 6D, when the synthesized carbon quantum dots were exposed to UV light, the color of the solution was changed from yellow to red, and emission color therefrom was changed from green to orange under the UV excitation light.

Figure 6E:
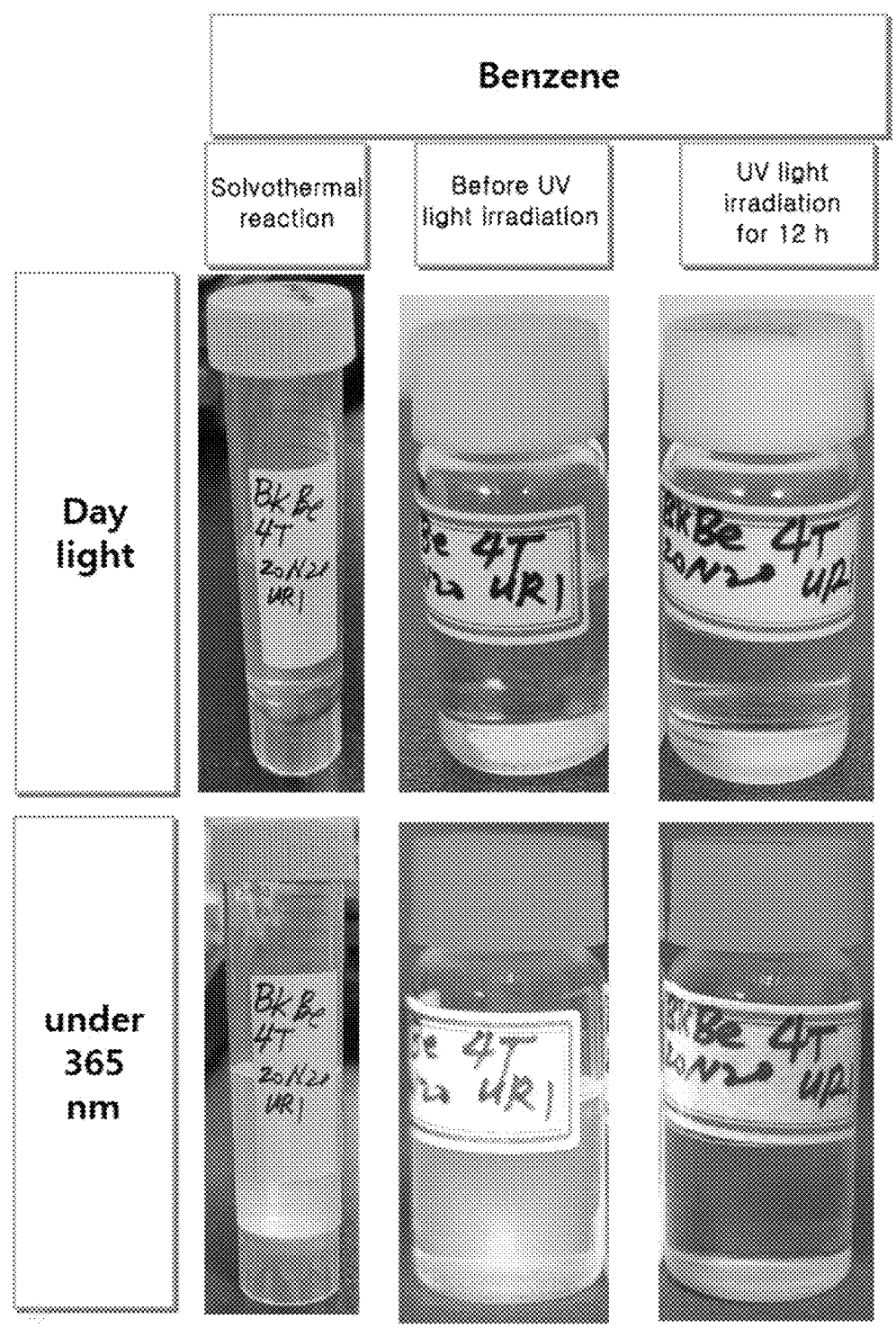

In the Present Example 1-5, as shown in FIG. 6E, when the synthesized carbon quantum dots were exposed to UV light, the color of the solution did not change, and emission color therefrom was changed from blue to yellow under the UV excitation light.

Figure 6F:
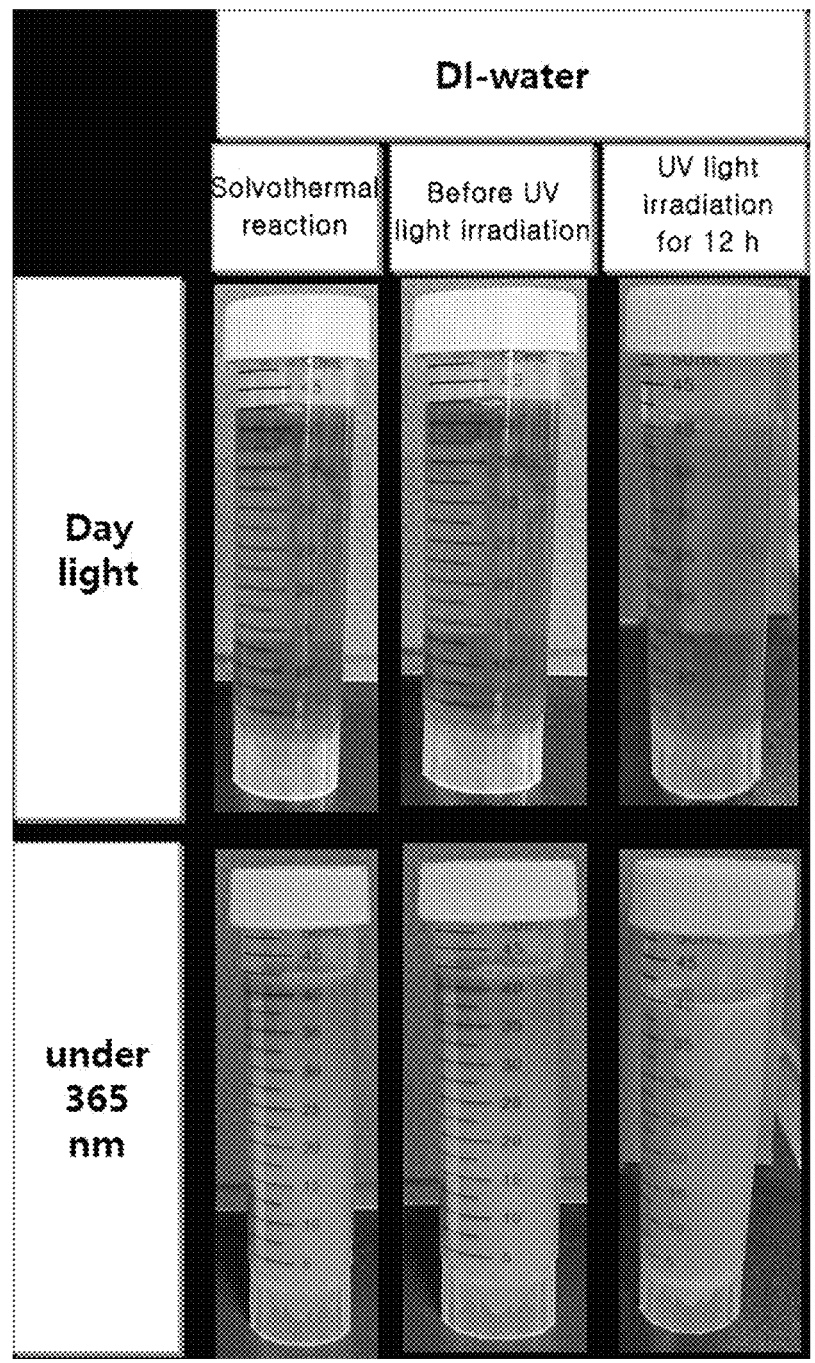
Figure 6G:
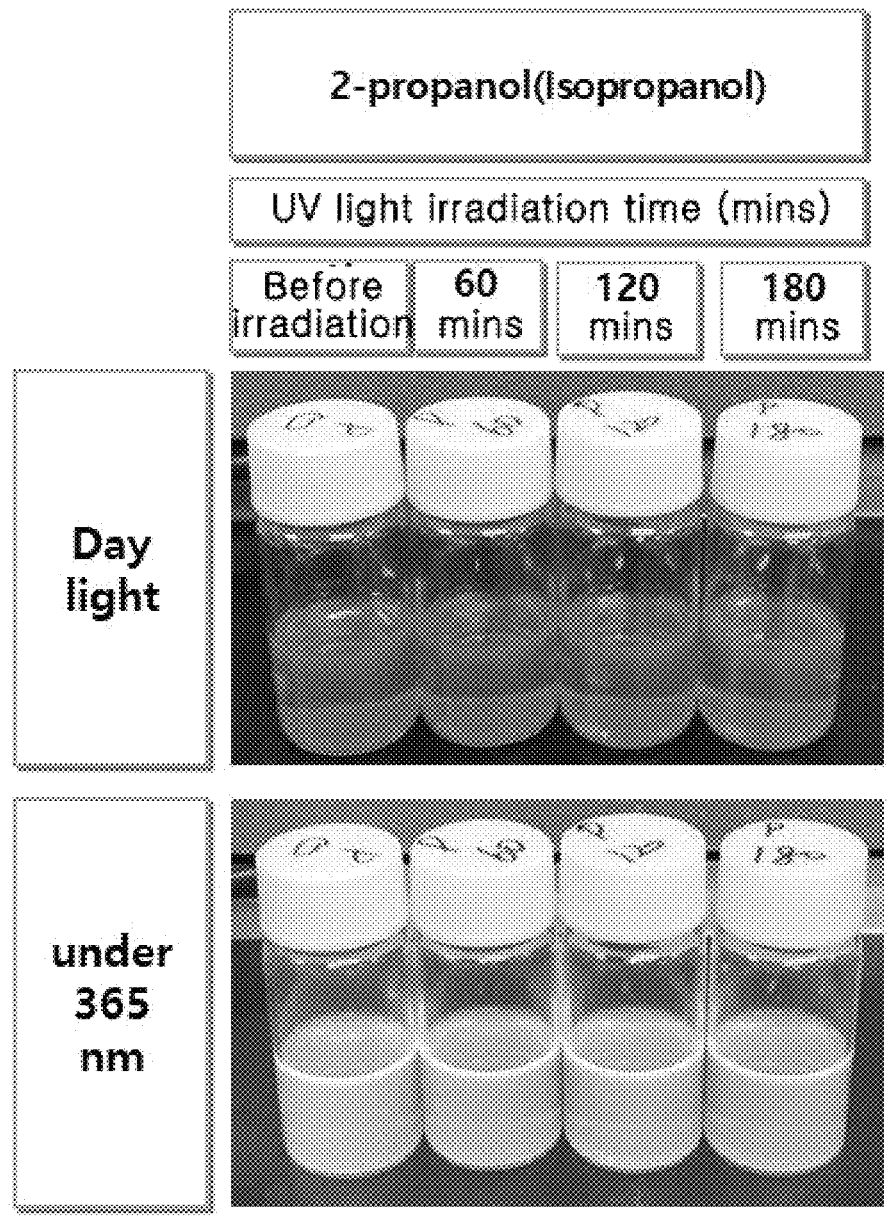
Figure 6H:
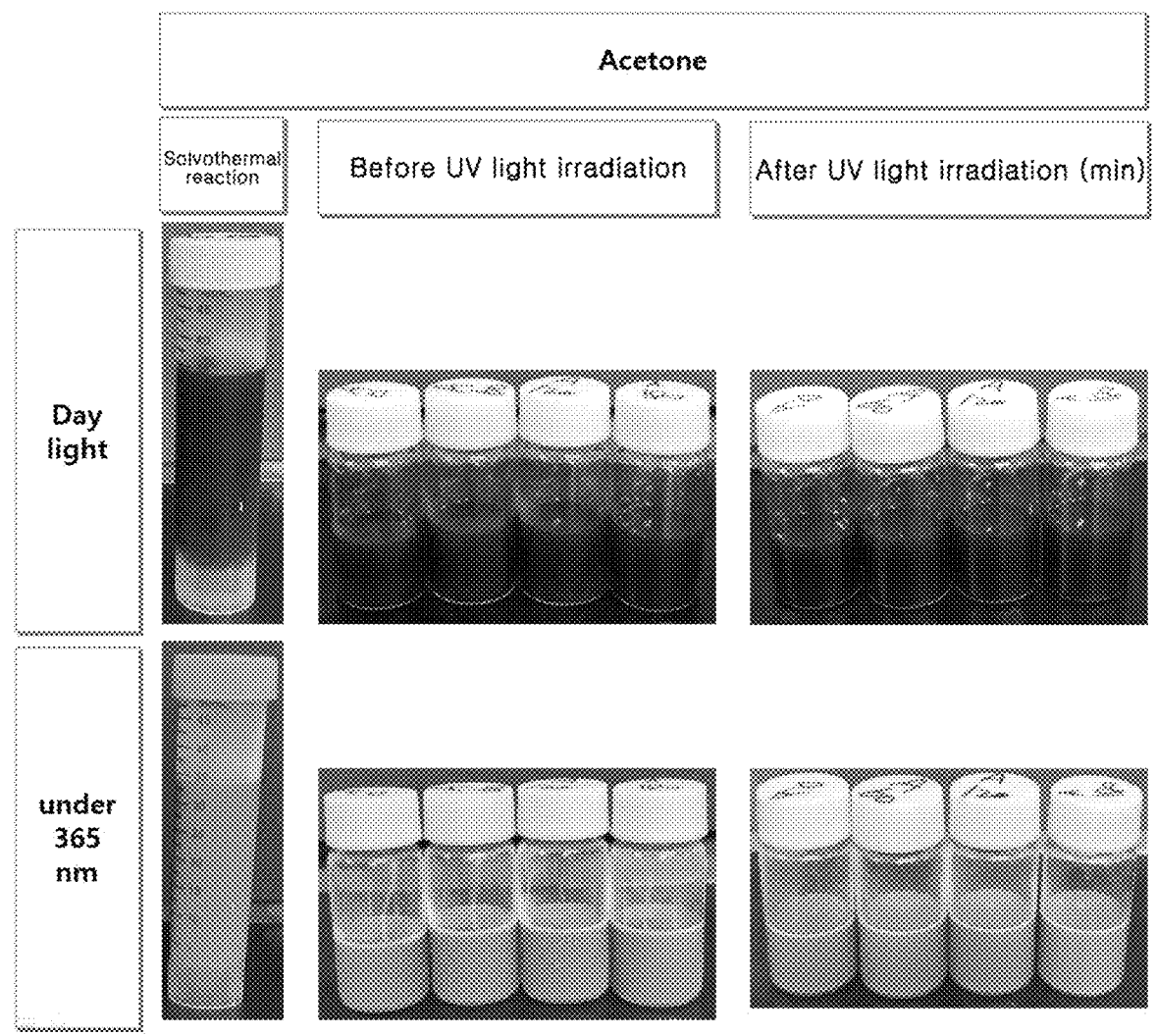

On the contrary, in Comparative Examples 1-1 to 1-3, referring to FIG. 6F to FIG. 6H, when the synthesized carbon quantum dots were exposed to UV light, there was no change in the color of the solution and change in emission color was not observed under the UV excitation light before and after UV light irradiation.

Comparison Between Characteristics of Carbon Quantum Dots Based on Color of Inkjet Printer Dye As shown in Table 2 below, carbon quantum dots were synthesized in the same manner as in Present Example 1 using inkjet printer dyes of various colors.

TABLE 2

|  | Color of inkjet printer dye |
| --- | --- |
| Present Example 1 | Blue |
| Comparative Example 2-1 | Yellow |
| Comparative Example 2-2 | Magenta |
| Comparative Example 2-3 | Black |

Figure 7:
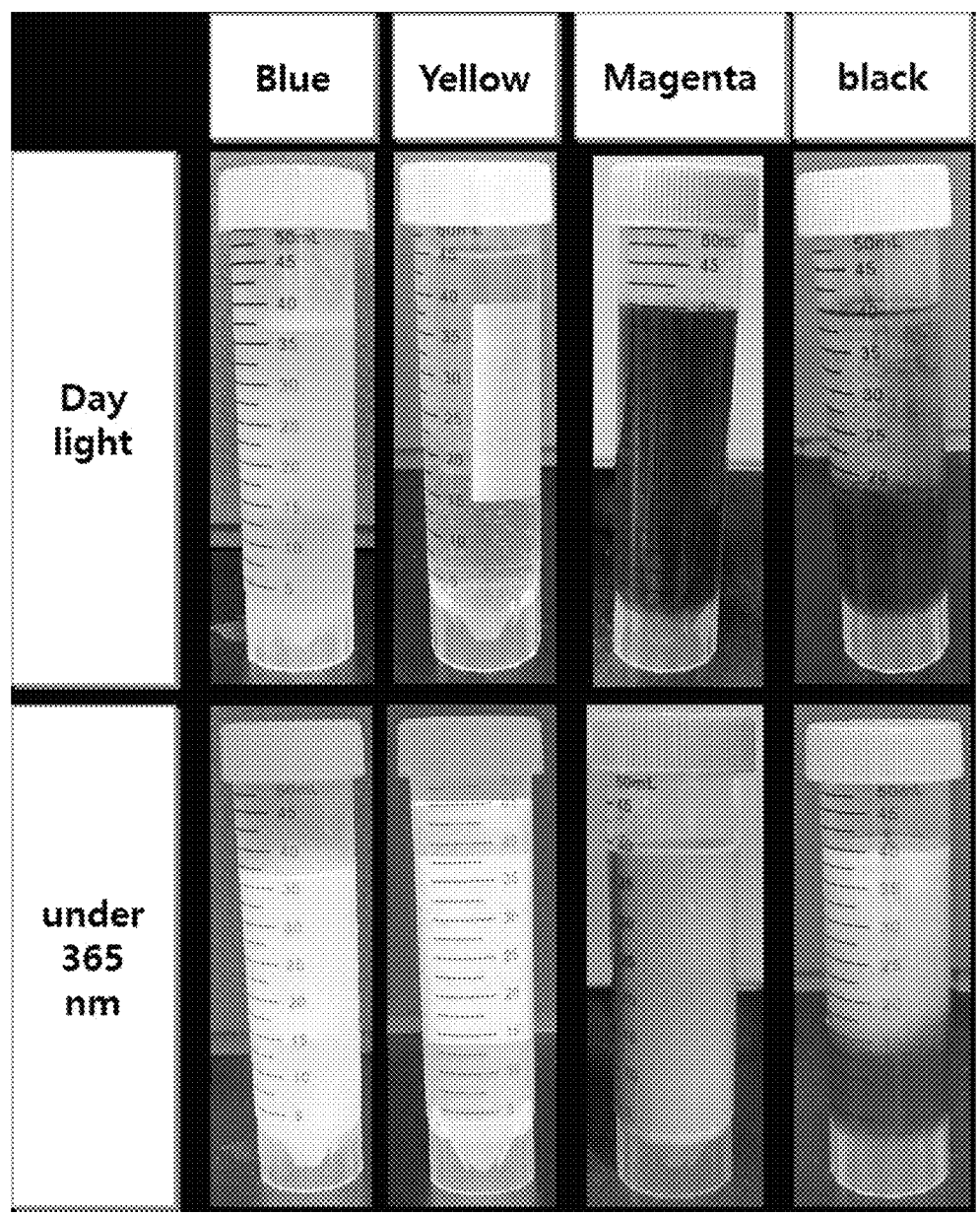
FIG. 7 is an image showing color and fluorescence of carbon quantum dots synthesized using inkjet printer dyes of various colors.
Figure 8:
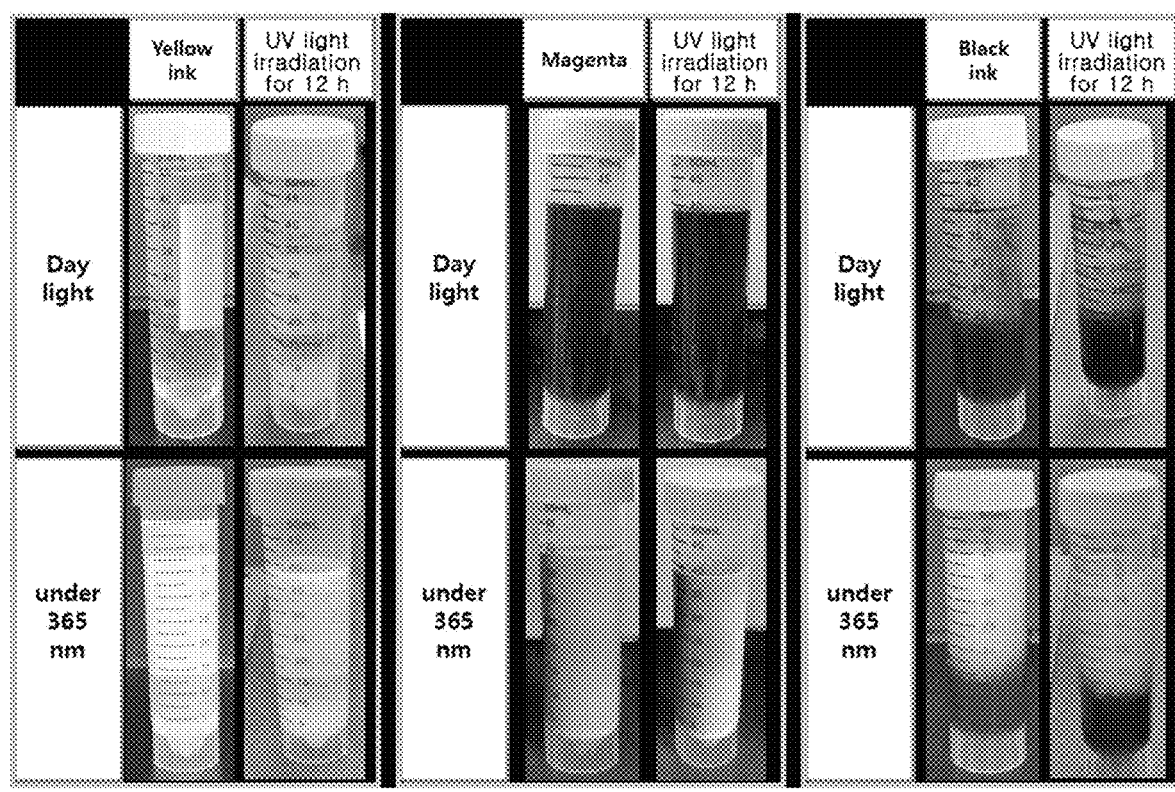
FIG. 8 shows images obtained by photographing color changes and fluorescence changes based on an exposure time duration to UV of carbon quantum dots synthesized according to Comparative Examples 2-1 to 2-3 of the present disclosure.

FIG. 7 is an image showing the color and fluorescence of carbon quantum dots synthesized using each of inkjet printer dyes of various colors. FIG. 8 shows images obtained by photographing color changes and fluorescence changes based on an exposure time duration to UV of carbon quantum dots synthesized according to Comparative Examples 2-1 to 2-3 of the present disclosure.

In the Present Example 1, as shown in FIG. 2, the color change of the solution and the change of the emission color from the dots were observed before and after UV light irradiation.

On the other hand, in Comparative Examples 2-1 to 2-3, as shown in FIG. 8, when UV light was irradiated to the synthesized carbon quantum dots, and neither the color change of the solution nor the change of emission color therefrom occurred.

Comparison Between Characteristics Carbon Quantum Dots Based on Synthesis Temperature As shown in Table 3 below, carbon quantum dots were synthesized in the same manner as in Present Example 1, except that the synthesis temperature was changed.

TABLE 3

|  | Synthesis temperature |
| --- | --- |
| Present Example 1 | 200° C. |
| Present Example 3-1 | 180° C. |
| Present Example 3-2 | 250° C. |
| Comparative Example 3-1 | 160° C. |

Figure 9:
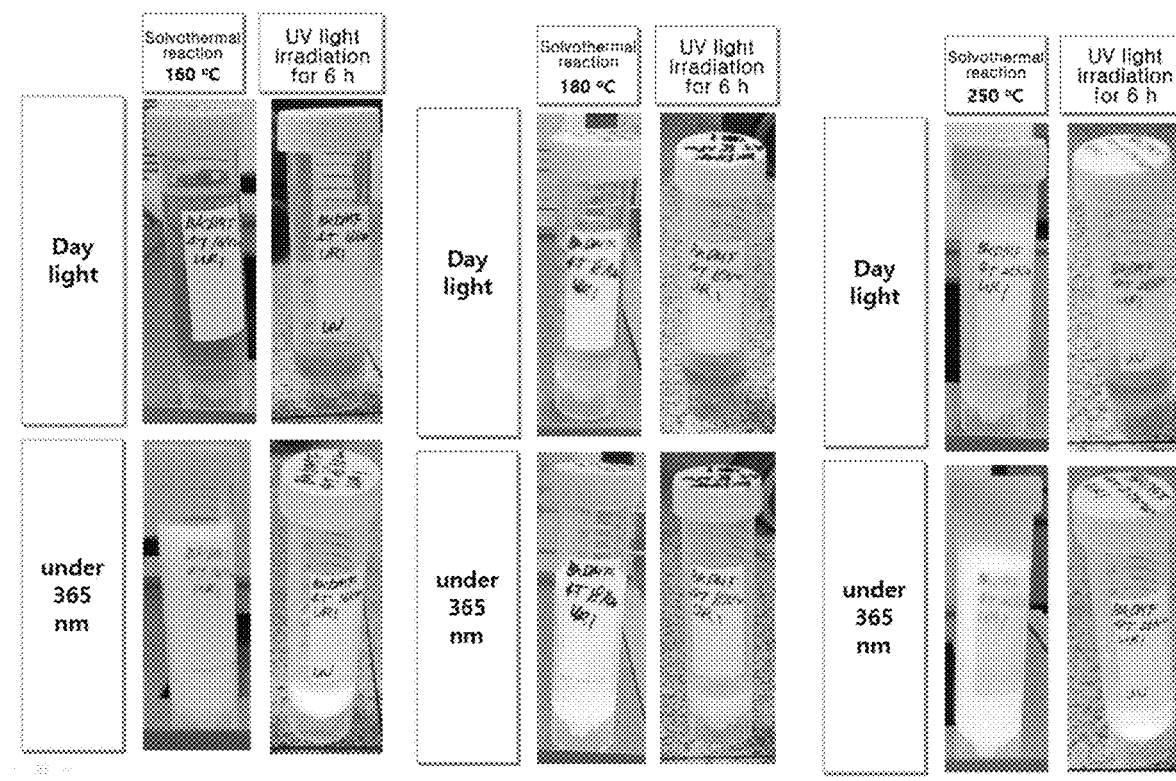
FIG. 9 shows captured images of color changes and fluorescence changes based on an exposure time duration to UV of carbon quantum dots synthesized according to Present Examples 3-1 to 3-2 and Comparative Example 3-1 of the present disclosure.

FIG. 9 shows an image of color change and fluorescence change based on an exposure time duration to UV of carbon quantum dots synthesized according to Present Examples 3-1 to 3-2 and Comparative Example 3-1 of the present disclosure.

Referring to FIG. 2 and FIG. 9, in Present Examples 1, 3-1, and 3-2, the synthesized carbon quantum dots had change in the color of the solution and change in emission color before and after UV light irradiation. However, in Comparative Example 3-1 (160° C.), no change in the color of the solution and no change in emission color was observed.

Thus, the synthesis temperature for the carbon quantum dots according to the present disclosure may be in a range of 180° C. to 250° C.

Comparison Between Characteristics of Carbon Quantum Dots Based on Types of Inkjet Printer Dye Carbon quantum dots were synthesized in the same way as in Present Example 1 using each of Brother's and Samsung's blue inkjet printer dyes, and, then were mixed with DMF to produce a solution (as-prepared).

Next, a solution in which 4 ml of purified water (DI water) and 4 ml of DMF were diluted in the carbon quantum dots solution (1 ml) was produced.

Figure 10A:
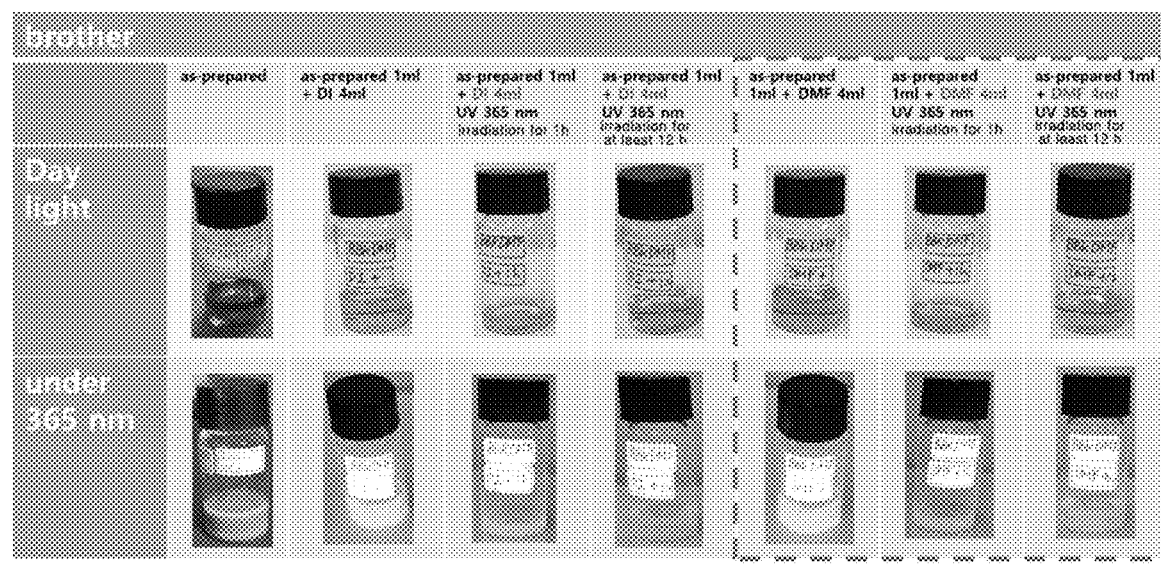
FIG. 10A shows change in solution color and change in emission color before and after irradiation of UV light of 365 nm wavelength to carbon quantum dots synthesized using Brother's blue inkjet printer dye.
Figure 10B:
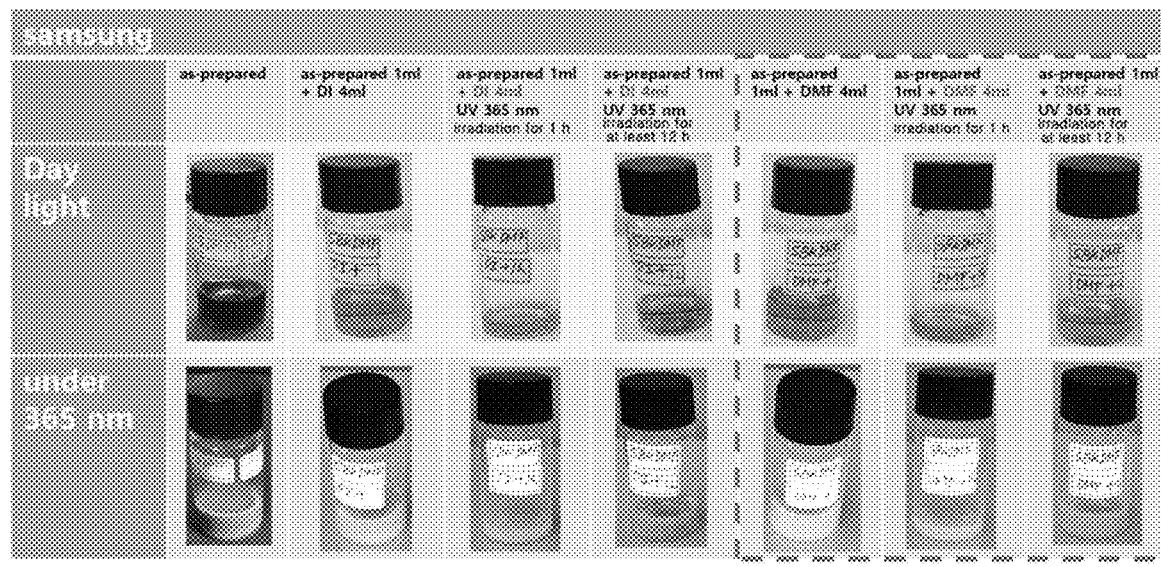
FIG. 10B shows change in solution color and change in emission color before and after irradiation of UV light of 365 nm wavelength to carbon quantum dots synthesized using Samsung's blue inkjet printer dye.

Then, the color change of the solution and emission color change of the solution before and after irradiation with UV light of 365 nm wavelength were identified, and the results are shown in FIG. 10A and FIG. 10B.

Referring to FIG. 10A as the result of using Brother's blue inkjet printer dye, it may be observed that the synthesized carbon quantum dots react to the UV light source to change the color of the solution and the emission color under UV excitation light.

Similarly, Referring to FIG. 10B as the result of using Samsung's blue inkjet printer dye, it may be observed that the synthesized carbon quantum dots react to the UV light source to change the color of the solution and the emission color under UV excitation light.

Although the embodiments of the present disclosure have been described in more detail with reference to the accompanying drawings, the present disclosure is not necessarily limited to these embodiments. The present disclosure may be implemented in various modified manners within the scope not departing from the technical idea of the present disclosure. Accordingly, the embodiments disclosed in the present disclosure are not intended to limit the technical idea of the present disclosure, but to describe the present disclosure. the scope of the technical idea of the present disclosure is not limited by the embodiments. Therefore, it should be understood that the embodiments as described above are illustrative and non-limiting in all respects. The scope of protection of the present disclosure should be interpreted by the claims, and all technical ideas within the scope of the present disclosure should be interpreted as being included in the scope of the present disclosure.

What is claimed is:

1. A method for producing carbon quantum dots having color change based on a cumulative amount of exposure thereof to UV light, the method including performing solvothermal reaction on blue inkjet printer dye, urea and an organic solvent in a high pressure reactor.

2. The method of claim 1, wherein the organic solvent includes one selected from a group consisting of DMF (dimethylformamide), ethanol, cyclohexane, toluene, THF (tetrahydrofuran) and benzene.

3. The method of claim 1, wherein the solvothermal reaction is performed for 3 hours or larger and at a temperature in a range of 180° C. to 250° C.

4. The method of claim 1, wherein the carbon quantum dots obtained via the solvothermal reaction have change in color or fluorescence based on a cumulative amount of exposure thereof to UV light.

5. A color change sensor for indicating a cumulative UV amount, the sensor including carbon quantum dots obtained by performing solvothermal reaction on blue inkjet printer dye, urea and an organic solvent in a high-pressure reactor.

6. The sensor of claim 5, wherein the color change sensor includes a liquid type sensor.

7. The sensor of claim 5, wherein the carbon quantum dots have change in color or fluorescence based on a cumulative amount of exposure thereof to UV light.

* * * * *